United States Patent
Best et al.

(10) Patent No.: US 11,663,657 B1
(45) Date of Patent: May 30, 2023

(54) SYSTEMS AND METHODS FOR COMMUNICATIONS REGARDING LOAN COLLATERAL

(71) Applicant: Federal Home Loan Mortgage Corporation, McLean, VA (US)

(72) Inventors: Annette M. Best, Ashburn, VA (US); Donald Rosenthal, Evergreen, CO (US); Ferdinand T. Wang, Bethesda, MD (US); Gary M. Skinner, Frederick, MD (US); Adrienne B. Lyne, Round Hill, VA (US)

(73) Assignee: FEDERAL HOME LOAN MORTGAGE CORPORATION (FREDDIE MAC), McLean, VA (US)

( * ) Notice: Subject to any disclaimer, the term of this patent is extended or adjusted under 35 U.S.C. 154(b) by 85 days.

(21) Appl. No.: 17/199,620

(22) Filed: Mar. 12, 2021

Related U.S. Application Data

(63) Continuation of application No. 14/966,234, filed on Dec. 11, 2015, now Pat. No. 10,963,958.
(Continued)

(51) Int. Cl.
*G06Q 40/02* (2023.01)
*H04W 68/00* (2009.01)
*H04L 67/10* (2022.01)

(52) U.S. Cl.
CPC ........... *G06Q 40/025* (2013.01); *H04L 67/10* (2013.01); *H04W 68/005* (2013.01)

(58) Field of Classification Search
CPC .... G06Q 40/025; H04L 67/10; H04W 68/005
(Continued)

(56) References Cited

U.S. PATENT DOCUMENTS

2001/0023414 A1* 9/2001 Kumar ............... G06Q 10/06
    708/170
2001/0034701 A1* 10/2001 Fox .................. G06Q 40/02
    705/38

(Continued)

OTHER PUBLICATIONS

Author Unknown, Loan Prospector® Functionality Guide, Freddie Mac, Jun. 2013, pp. 1-56; published on the Internet at www.freddiemac.com/learn/pdfs/uw/fun_guide.pdf.
(Continued)

*Primary Examiner* — Clifford B Madamba
(74) *Attorney, Agent, or Firm* — MH2 Technology Law Group, LLP

(57) ABSTRACT

Systems, methods, and products communicate loan collateral information. A central server receives collateral data that is filtered based on collateral identification information. A problem in the filtered collateral data is identified by applying a set of collateral analysis rules and accessing related supplemental data to detect one or more differences between the filtered collateral data and the supplemental data. A notification is generated that includes descriptions of the problem and the filtered collateral data, and a navigation link to access more information from a source of problem information. The notification is transmitted to a remote computing device based on a destination address, including an internet protocol address. The notification is in a format compatible with the remote computing device. The notification activates a collateral viewer application to display the notification on the remote computing device and to enable connection to the source of problem information via the navigation link.

20 Claims, 8 Drawing Sheets

Related U.S. Application Data

(60) Provisional application No. 62/090,810, filed on Dec. 11, 2014.

(58) Field of Classification Search
USPC .......................................................... 703/38
See application file for complete search history.

(56) References Cited

U.S. PATENT DOCUMENTS

| | | | |
|---|---|---|---|
| 2010/0274708 A1* | 10/2010 | Allen ..................... | G06Q 40/02 705/38 |
| 2013/0066766 A1 | 3/2013 | Kemper et al. | |
| 2015/0339769 A1* | 11/2015 | deOliveira ........... | G06Q 40/025 705/38 |

OTHER PUBLICATIONS

Non-Final Office Action issued in corresponding U.S. Appl. No. 14/966,234 dated Sep. 10, 2018, (20 pages).

Final Office Action issued in corresponding U.S. Appl. No. 14/966,234 dated Apr. 4, 2019, (17 pages).

Non-Final Office Action issued in corresponding U.S. Appl. No. 14/966,234 dated Jul. 30, 2019, (13 pages).

Final Office Action issued in corresponding U.S. Appl. No. 14/966,234 dated Mar. 5, 2020, (23 pages).

Notice of Allowance issued in corresponding U.S. Appl. No. 14/966,234 dated Dec. 2, 2020, (11 pages).

* cited by examiner

FIG. 4B

| Rule ID | Description | Notification Text | User-Defined Arguments | Collateral Data Field |
|---|---|---|---|---|
| 1049 | Triggers if the subject quality rating is under the {Q6}. Rule applies only to UAD forms. | [FAIL] The quality rating of the subject property reported in the {Q6} of this loan is not a better Reference Mortgage, the property is not eligible for sale to Freddie Mac. | numQualities < Q6 | dataPoint: Q6 Quality of Construction Rating Type$ fieldName: Quality$ formSection: Sales Comparison$ property: Subject |
| 1064 | Triggers if the subject's GLA varies by more than {GLAvarianceThreshold}% from greater than {numHistoricalReports} historical reports that are no more than {monthsCutoff} months prior to the current appraisal's effective date. | [FAIL] The gross living area for the subject property ({1528}) varies by more than {5}% from six (6) prior appraisals on the subject property within the last {326} months. Please confirm the reporting gross living area for the subject property is accurate and resubmit. | GLAvarianceThreshold = 50 monthsCutoff = 1,200 numHistoricalReports = 50 populationPercentage = 90 | dataPoint: Sale Price Adjustment Description$ fieldName: GLA$ formSection: Sales Comparison$ property: Subject |
| 5172 | Triggers if the subject's improvement section Gross Living Area is not equal to the Subject's Sales Comparison section Gross Living Area. | [FAIL] The Gross Living Area ({1504}) in the Improvements section is inconsistent with the Gross Living Area ({1504}) in the Sales Comparison section. Please correct and resubmit. | | dataPoint: Gross Living Area$ Square Feet Count$ fieldName: Square Feet of Gross Living Area Above Grade$ formSection: Improvements and Sales Comparison$ property: Subject |
| 5038 | Triggers when the report sold comp sale dates are significantly older (as compared to the effective date of the report) than historical reports in the same zip code. Requires at least {minCount} properties in the area, and fails if the current report comp sale dates are more than {popThreshold} standard deviations older than the average for the area. | [FAIL] Upon review of {1260} valuations completed in the subject's zip code over the last year, the 'average' recency of comp sales is {259 days} from the effective date of value. [Standard Deviation = 217 days]. The 'average' recency of comp sale dates in the appraisal is questionable at [{2294} days]. | SDtolerance = 85 minCount = 300 | dataPoint: N/A$ fieldName: N/A$ formSection: N/A$ property: N/A |

SYSTEMS AND METHODS FOR COMMUNICATIONS REGARDING LOAN COLLATERAL

CROSS-REFERENCE TO RELATED APPLICATIONS

This application is a continuation application of U.S. patent application Ser. No. 14/966,234 filed on 11 Dec. 2015, and entitled "Systems and Methods for Communications Regarding Loan Collateral," which claims the benefit of U.S. Provisional Application No. 62/090,810 filed on 11 Dec. 2014, both of which are hereby incorporated by reference in their entirety. This application is related to U.S. patent application Ser. No. 13/833,611 filed on 15 Mar. 2013, and entitled "Systems and Methods for Loan Purchase Eligibility Assessment," which is hereby incorporated by reference in its entirety.

FIELD OF THE INVENTION

This invention relates to communications during the loan creation process regarding a loan's collateral, and more particularly, to improved real-time communications systems with messaging related to loan collateral.

BACKGROUND

Many loans, including mortgage loans secured by real estate as the collateral, are underwritten and originated by lenders and their associates with the aim of selling the loan on the secondary market to a purchaser who may be an investor. For mortgage loans, the secondary market investors include government-sponsored entities (GSE), such as the Federal Home Loan Mortgage Company, also known as Freddie Mac. In order to be eligible for purchase by a secondary market investor such as Freddie Mac, a loan must meet all the requirements set by the investor, and a lender that plans to sell typically wants to create loans that meet the investor's requirements so that the investor will purchase them. In addition, a secondary market investor may offer other benefits to the seller of a loan after the investor has bought the loan, such as waiving some or all of the seller's representations and warranties made in connection with the sale of the loan, on condition that the loan satisfies specific criteria specified by the buyer.

In order for a loan to meet all of the requirements set by the potential future buyer, such as a GSE, the collateral for the loan, including the appraisal of the collateral, must meet the future buyer's requirements regarding the collateral. Although a lender performs collateral data collection and the appraisal before a loan closes, current conventional systems and practices do not evaluate the collateral and the appraisal until after the loan is closed, and in many cases not until after the loan has been purchased by a buyer on the secondary market. At such points in time, it is generally too late for the lender to fix any problems with the collateral data or the appraisal, and, among other drawbacks, the lender could be required (e.g. contractually obligated) to repurchase or buy back an already-sold loan because the loan's collateral does not meet the purchaser's requirements, or the lender cannot sell the loan in the first place because the collateral does not meet the purchaser's requirements.

Accordingly, it is desirable to develop improved systems, methods and techniques for assessing a loan during the various stages of its creation and service life to determine whether the loan meets the purchase eligibility requirements and/or other benefit-triggering requirements set by a purchaser. Moreover, it is desirable to develop improved systems, methods and techniques for analyzing and communicating in real time information regarding the appraisal and collateral that backs a loan before the loan is closed.

BRIEF DESCRIPTION OF THE DRAWINGS

The accompanying drawings, which are incorporated into and constitute a part of this specification, illustrate embodiments of the invention and together with the description, serve to explain the principles of the invention. In the figures:

FIG. 4B is a table showing examples of collateral analysis rules that are implemented by systems and methods consistent with embodiments of the invention;

FIG. 4C is another table showing examples of collateral analysis rules that are implemented by systems and methods consistent with embodiments of the invention;

FIG. 5 is an example of a graphical user interface for displaying collateral data, rules, and problem information, consistent with embodiments of the invention.

DETAILED DESCRIPTION OF THE EMBODIMENTS

Figure 1:
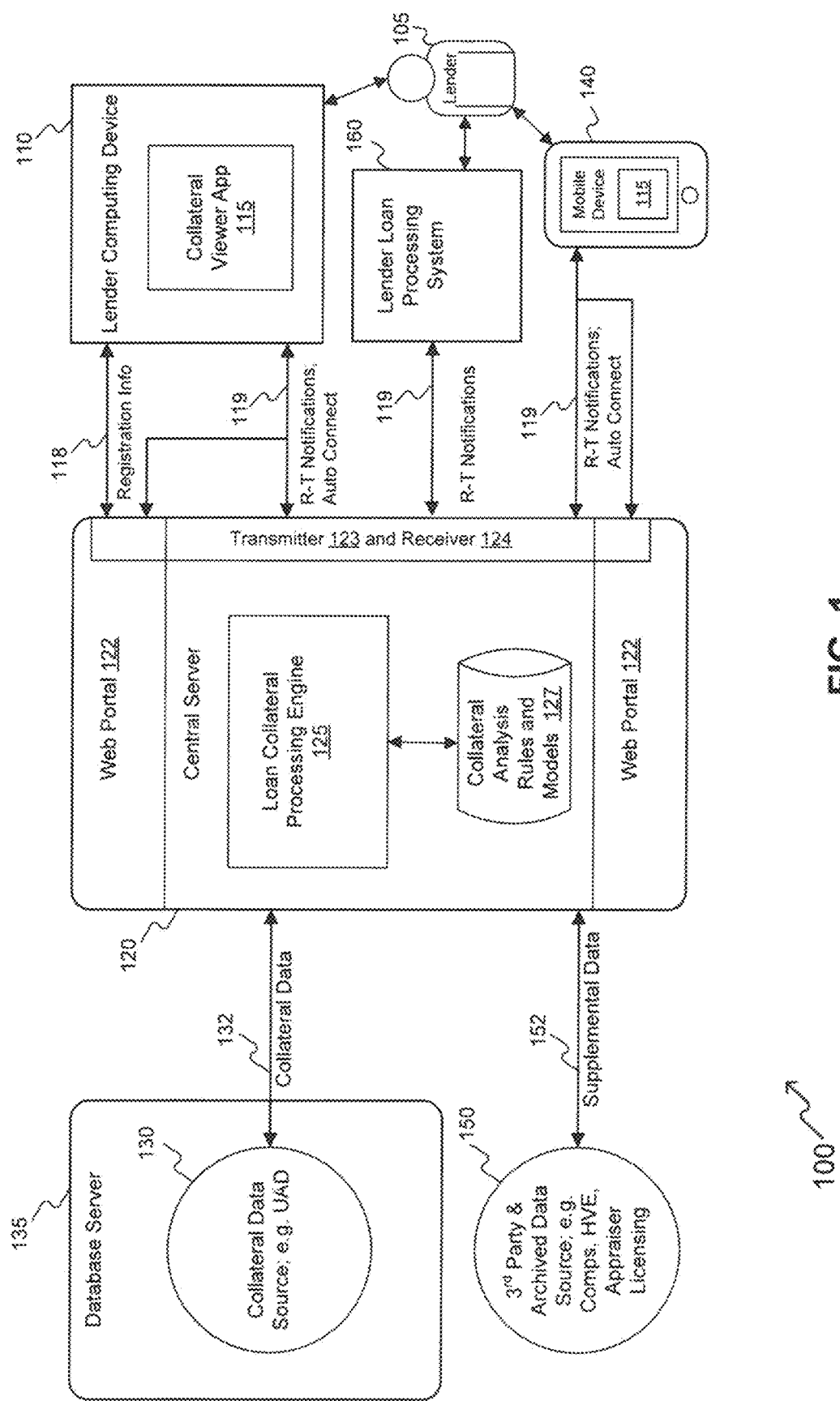
FIG. 1 is a block diagram illustrating an example of a system for real time analysis and communication regarding the collateral of a loan, consistent with embodiments of the invention.

Reference will now be made in detail to various embodiments of the invention, examples of which are illustrated in the accompanying drawings. Wherever convenient, the same reference numbers will be used throughout the drawings to refer to the same or like parts.

Various embodiments consistent with the invention include systems, components, methods, and computer program products that provide a novel real-time analysis functionality and a new real-time communication channel that alerts a lender or other loan originator (hereinafter "lender") to a problem(s) with a loan's collateral, including problems with the appraisal of the collateral. The described embodiments may provide lenders with an opportunity to correct any problems with the collateral, which gives the lenders a degree of confidence or certainty that the collateral's loan will be purchased and/or qualify for other benefits before or after a purchaser (e.g., a secondary loan market investor, such as Freddie Mac) makes a commitment to buy or buys the loan. Similarly, by a providing real-time opportunity to correct any problems with the collateral before a loan is closed, the described embodiments may also provide the lenders (e.g., banks) with a degree of confidence or certainty that the loan qualifies for a benefit offered by the purchaser, such as representations and warranties relief benefit (also known as "rep and warranty relief"), which is a waiver, by the purchaser of the loan, of the contractual representations and warranties made by the lender (i.e., the loan seller) to the loan purchaser.

Various embodiments described herein are directed to a novel collateral analysis and alert system that transmits to lenders, on their local computers, customized collateral problem reports or notifications in real time from a remote system that interacts with a remote data source (e.g., a database containing uniform appraisal dataset (UAD) information). Current conventional systems, in contrast, do not have the technical ability to analyze collateral data in real time or to communicate directly with a lender in real time to provide notice of any problems. This is a significant technical drawback of conventional systems, because information about problems with a loan's collateral is time sensitive. The lender's ability to identify appraisal defects and collateral eligibility issues in real time increases the likelihood of a remedy, reduces potential impacts to the loan closing timeline, and minimizes the lender's risk of securing a loan with deficient documentation, or collateral that may not be eligible for sale to one or more GSE. In addition, this ability may prevent the lender from reserving money that could be used for lucrative loans, or from borrowing money and paying interest, to fund what appears to be a satisfactory loan, but which in reality is a loan with serious collateral problems, such as a deceptively high or fraudulent appraisal value.

In addition, many current conventional systems do batch work on the collateral and appraisal data for several properties associated with several loans that are under production for a given lender, and then simply transmit all of the available collateral and appraisal information to that lender at the same time, when the batch processing is done. This requires the lender to sort through large amounts of data to identify relevant collateral and appraisal information (e.g., to identify problems), which is very time consuming and error prone. In addition, such conventional systems often send information at inconvenient times when the information cannot be acted on quickly, such as after the lenders (e.g., banks) are closed. Various embodiments described herein and consistent with the present invention solve these technical problems, among others.

FIG. 1 illustrates an example of a system 100 for real time analysis and communication regarding the collateral of a loan, consistent with embodiments of the invention. Various embodiments of a collateral analysis and communication system 100 described herein may include a central server computer 120 implementing a loan collateral processing engine 125 (LCPE) to access (e.g., receive or retrieve) collateral data 132 from a collateral data source 130 implemented by a database server 135, analyze the collateral data 132 to discover any problems, send real-time notifications regarding analysis-selected data (e.g. problems) to lenders 105, and perform other functions and operations as described herein. The server computer 120 may include a memory (not shown), a transmitter 123, a receiver 124, and a microprocessor (not shown), and it may communicate with other remote systems and devices, such as a lender computing device 110, a mobile computing device 140 (e.g., a smartphone or a tablet computer), the database server computer 135, and third party and archived data source(s) 150, via one or more communications networks (not shown), such as the Internet and/or a cellular telephone network.

The embodiments described herein may also supply or provide a collateral viewer application 115 and/or a web portal 122 to the lenders 105. In various embodiments, the lenders 105 may install the collateral viewer application on their individual computing devices 110, 140, and/or in some embodiments may access the web portal 122 using any computing device that executes a browser.

In various embodiments, when registering to use the embodiments of systems and methods described herein, a lender 105 may provide registration information 118 to the server 120 executing the LCPE 125, where the registration information 118 includes the destination address or other contact information for the wireless device 140 and/or the lending computing device 110, such as the number for a cellular phone, an email address accessible from a tablet computer, an IP address, or the like. The registration information 118 also includes identification information that can be used to identify or select collateral data 132 associated with the lender 105 (e.g., a lender name, a lender ID number, an appraiser number, etc.). As part of the registration process, the server 120 may transmit, download, or otherwise provide to the lender 105 the collateral viewer application 115 that executes on the lender computing device 110 and/or the mobile device 140.

The lender 105 may register with the system in various ways in various embodiments. For example, the lender 105 may use a remote computing device 110, 140 to register via the web portal 122 of the central server 120. For another example, the lender 105 may register with a loan advisor suite (see FIG. 2 for more details), which includes several components and subsystems, and which shares or provides the registration information to its components and subsystems, so that they access a common data set.

In various embodiments as shown in FIG. 1), the LCPE 125 receives collateral data 132 that is digitally sent from the remote database server 135, which hosts the collateral data source 130, to the LCPE server 120. In some embodiments, the remote collateral data source 130 may be or include a property's appraisal (valuation) report, which may be in Uniform Appraisal Dataset (UAD) format, as is known in the home mortgage industry. After a lender 105 registers for the services provided by the system 100, the LCPE 125 can filter the collateral data 132 based upon the lender's registration information 118 that is stored in memory or a storage device, for instance on the LCPE server 120. To filter, select, or otherwise identify the relevant information, the LCPE 125 may, for example, compare the received collateral data 132, (which may include data for many different lenders), to the lender's identification information or to the identification information for the lender's loans (e.g. contained in the stored registration information 118) to determine which collateral data 132 is related to loans that correspond to the lender 105, such as loans that are in the process of being created or originated by the lender 105.

After filtering or otherwise identifying the collateral data 132 for, related to, or relevant to the lender's loans, the LCPE 125 analyzes this collateral data in real time (e.g., in less than ten seconds, such as five seconds, three seconds, or more likely, two seconds or one second) to identify current or potential problems with the collateral data. In various embodiments, the LCPE 125 may analyze the collateral data 132 by applying, executing, interpreting, or otherwise employing a set of collateral analysis rules and models 127, which specify conditions or criteria with which the loan collateral 132 must or should comply, for example, to be considered problem-free. In various implementations, the LCPE 125 may perform rules-based processing and analysis: to evaluate the completeness and accuracy of the appraisal data contained in the collateral data 132 (this may include verifying some of the appraisal data items with third party and archived data sources 150); to evaluate the quality of an appraisal (e.g., by making sure the comparable properties used to generate the appraisal are truly similar to the collateral property); to evaluate the eligibility of a collateral property for a loan product or purchaser benefit (e.g., confirming that the property is not a commercial property if a residential loan or a residential benefit is sought); to evaluate the estimated valuation of a collateral property (e.g., validating the accuracy of the appraised value using a real estate automated valuation model (AVM)); and to produce data and analytics describing the collateral, including any problems found by the rules-based analysis (e.g., sending notification that the appraisal is not good enough to qualify for representation and warranty relief because a specific collateral data item does not conform to a specific condition or criteria).

In various implementations, in addition to or as part of rules-based processing and analysis, the LCPE 125 may employ third party and archived data sources 150 to validate or otherwise evaluate portions of the collateral data 132. In various embodiments, the third party and archived data sources 150 may include databases, service providers, automated systems, etc. that provide appraisal-related information (e.g. comparable properties information), appraiser information (e.g., appraiser licensing information), property valuation information (e.g., the output of an AVM), etc. In particular, the LCPE 125 may request specific information from the third party and archived data sources 150 that corresponds to information recorded in the collateral data 132 (e.g., information describing the comparable properties used to generate the appraisal valuation, information describing the appraiser, information describing the appraisal value, etc.), and the third party and archived data sources 150 may respond by sending the requested information as supplemental data 152. The LCPE 125 may then compare information in the supplemental data 152 to the corresponding information in the collateral data 132 to determine whether there is a disagreement, mismatch outside of a margin of error, or other problem.

In sum, as a result of its analysis of the collateral data 132, the LCPE 125 may identify any problem(s) with the collateral that backs a loan by the lender 105.

Using the results of the analysis, various implementations of the LCPE 125 build in real time a notification 119 that contains, for example, a collateral problem alert message with a description of the identified problem(s) and a description or copy of the portion of the collateral data 132 that caused, contains, or indicates the problem. In various embodiments, the collateral-problem-alert notification 119 may also contain a navigation link that provides access to additional details and information from a source of information about the problem and/or the collateral, such as, for example, the web portal 122 or a separately hosted web page that contains further information or details about the relevant collateral data and the problem. In some embodiments, the navigation link may, for example, be a universal resource locator (URL) that the lender 105 may activate using a web browser (not shown) executing on the lender computing device 110 or the mobile device 140 to retrieve and display a web page that is customized with additional data, details, and information related to the notification 119 and the problem(s). (See, for example, FIG. 5). In other embodiments, the navigation link may, for example, be information or instructions that cause the collateral viewer application 115 to auto connect 119 to the central server 120 and access or retrieve additional details and data from a source of problem information, for example from the server 120, and to display further customized information and details about the relevant collateral data and the problem. (See, for example, FIG. 5).

In various embodiments, the transmitter 123 of the server 120 transmits the collateral problem alert notification 119 to the lender's wireless device 140 and/or to the lender computing device, or the like, in real time (e.g., within ten, and preferably one to three seconds of receiving the collateral data 132). The server 120 may format the alert notification 119 to be compatible with the remote device that is to receive the notification 119, e.g., as a text, as an email, or as a digital communication that activates and/or causes operations to be performed by the collateral viewer app 115 and/or another program executing on the remote device 110, 140. As noted above, some embodiments of the notification 119 may contain a navigation link that, for example, may be a universal resource locator (URL) that the lender 105 may activate using a web browser executing on the lender computing device 110 or the mobile device 140. In other embodiments, the navigation link could be information or instructions that cause the collateral viewer application 115 to automatically connect to, access or retrieve, and display further information or details about the collateral data and the problem, for example, from the server 120 or from some other information source such as a web page or the like provided by a web server other than the server 120.

In various implementations, a lender loan processing system 160 may directly communicate with the central server without utilizing the web portal 122. In such implementations, the lender 105 would not need to log into the web portal 122, but instead would log onto the lender loan processing system 160, which interfaces system-to-system with the central server 120, and the central server 120 and the LCPE 125 send their output (e.g. notifications 119) directly to the lender loan processing system 160.

In various embodiments, receipt of the notification 119 causes the lender computing device 110 and/or the mobile device 140 to auto-launch the collateral viewer application 115, and the collateral viewer application 115 may display the notification 119. In some embodiments, the collateral viewer application 115 may display a user-activated navigation link or may automatically connect to an information source such as the server 120 without using a navigation link. The data source connected to may provide details and relevant problem information to the lender 105. And, using the information provided by this new, real-time communication link between the server 120 and the registered computing devices of the lender 105, the lender 105 can act immediately to address or take action to correct any problems with the collateral that backs a loan, before the loan closes or other drawbacks occur.

The example depicted in FIG. 1 is merely for the purpose of illustration and is not intended to be limiting. Further, the depicted system 100 is an example that has been simplified for clarity of explanation of certain novel and innovative features consistent with certain disclosed embodiments, but this example is not intended to be limiting and many variations are possible. For example, although FIG. 1 and the other examples herein are described in the context of real estate mortgage loans where the collateral is real property, variations consistent with principles of the invention encompass other types of collateral and loans, such as automobiles and automobile financing loans.

In various embodiments consistent with the present disclosure, the system 100 may be part of or a subsystem of a larger system or a suite of components, systems, programs, or the like that have real time access to, and operate using, additional, more uniform, and more frequently updated data about a loan than that used by conventional systems, including data about the collateral for a loan. Various embodiments use this improved loan data to evaluate the loan and its collateral more accurately and in real time, and to advise the lenders in real time regarding the data's' completeness, eligibility, salability, appraisal quality, etc., and regarding the benefit-earning ability of the loan and collateral with respect to a secondary market buyer or other loan purchaser. And various embodiments may perform these functions throughout the loan-manufacturing process and beyond. This allows a secondary market purchaser to help lenders manufacture quality loans and to provide benefits to lenders, such as representation (a.k.a. rep) and warranty relief, including, for example, rep and warranty relief offered or granted to the lender before the loan closes or within days after the loan is bought by a secondary market purchaser.

Figure 2:
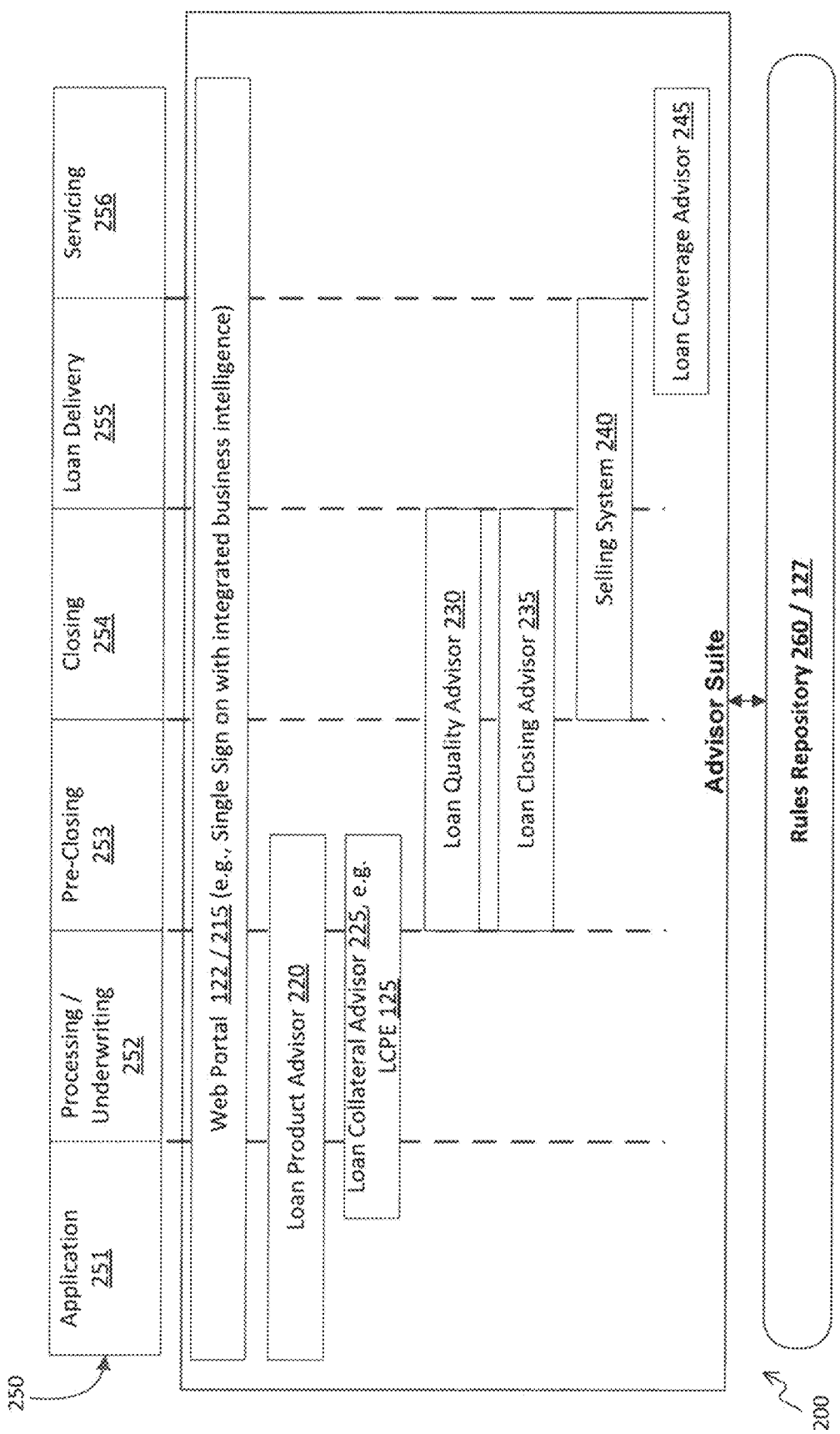
FIG. 2 is a block diagram illustrating an example of a system for assessing a loan and advising the lender regarding a loan, including a loan collateral advisor subsystem or component, consistent with embodiments of the invention.

FIG. 2 illustrates an example of a larger system 200 for assessing a loan and advising the lender regarding a loan, which includes a loan collateral advisor subsystem or component 225, such as the LCPE 125. The system 200 is shown in the context of an exemplary loan creation and sale sequence 250. In the embodiment shown, the loan creation and sale sequence 250 begins with an application activity 251 where a loan originator (e.g., the lender 105) initially interacts with a loan applicant and gathers initial loan information, including, for example, information about the type and amount of loan, information about the applicant's job, salary, credit history, savings, etc., information about the collateral (e.g., the real estate to be purchased with the loan monies), and other information needed to begin loan origination, as is known in the art. As used in this disclosure, the term "loan data" includes not only data or information describing a loan itself (e.g., loan amount, interest rate, loan type, loan term, down payment, etc.), but may also include data or information about the borrower (e.g., name, address, social security number (SSN), employer, salary, other income, FICO score, savings, investments, etc.) and the collateral (e.g., address of property, sale price, appraised value, comparable sales, the appraisal report, etc.). And, the term "loan data" includes any or all of several sets of industry-known data used to describes loans, including without limitation ULAD, UAD, ULDD, and UCD.

At a processing/underwriting activity 252, the information from the application activity 251 is processed by the lender, which may include determining an appropriate loan product(s) (e.g., type of loan, loan terms, rates, etc.), identifying and/or gathering additional information needed from the applicant, etc.

Also during the processing/underwriting activity 252, the loan underwriter determines whether the risk (especially the risk that the borrower will default) of offering a particular loan to a particular applicant is acceptable. In an underwriting evaluation of a real estate loan, in addition to analyzing the creditworthiness of the applicant, the property that is the collateral is evaluated, for example regarding whether the property is capable of redeeming the loan value or not. For example, the lender may hire an appraiser to do an appraisal of the property, or may direct an appraisal management company (AMC) to order or perform an appraisal. Upon receiving the completed appraisal report, which is typically formatted in a manner that complies with the uniform appraisal dataset (UAD) standards, the lender or AMC submits the appraisal to the collateral data source 130. In various embodiments, the collateral data source 130 may be the uniform collateral data portal (UCDP®) as is known in the lending industry.

At a preclosing activity 253, the lender prepares all the documents and data needed to close the loan, including, in some implementations, the new Consumer Finance Protection Bureau documentation.

At the closing activity 254, the loan undergoes a quality control check and the loan is packaged for shipping, for example, by arranging and formatting the loan data in the manner required by a loan purchaser's "selling" system, which determines whether the loan meets the purchaser's requirements, including its collateral requirements.

As shown in FIG. 2, activities 251-254 of the sequence 250 may be supported by the loan product advisor 220, the loan collateral advisor 225, the loan quality advisor 230 and/or the loan closing advisor 235, which are components or subsystems of the advisor suite 200 and which may all work on a shared set of loan data (not shown). In various embodiments, the components may be implemented in hardware in firmware with a processor, or in a computing system specialized by software to perform the unique functions described herein.

For example, the loan collateral advisor may be implemented by the LCPE 125 of (e.g., executing on and/or performed by the hardware of) the central server 120 of FIG. 1. As noted above with regard to the processing/underwriting activity 252, the lender or AMC may store the collateral data 132 for a loan (e.g., in the form of UAD) into the collateral data source 130 of the database server 135, and the central server 120 may connect to the database server 135 to access and copy the collateral data 132 into its local storage devices, and then process and assess the collateral data 132 according to its collateral analysis rules and models 127.

In most cases, the first four activities 251-254 of the loan creation and sale sequence 250 are performed by a lender or other loan originator, such as a lending bank, lending credit union, mortgage broker, and/or an underwriter, which, in the case of a lending bank or lending credit union may be the same lending institution, or in the case of a mortgage broker, may be loan wholesaler or a lending institution acting as an underwriter. Thus, the lender, (which may typically sell the loan) may be a primary user of the loan product advisor 220, the loan collateral advisor 125, the loan quality advisor 230 and the loan closing advisor 235 components of the advisor suite 200. In some cases, the loan seller may be a wholesaler, an aggregator, the underwriter or some other party other than the lender. Regardless, the loan seller may sell the loan on the secondary loan market or secondary market.

At loan delivery activity 255 of the loan creation and sale sequence 250, the sold loan is delivered to the purchaser. And, at servicing activity 256, the sold loan is serviced, often by the seller or the purchaser. As shown in FIG. 2, the activities 255-256 may be supported by the selling system 240 and the loan coverage advisor 245, which are components or subsystems of the advisor suite 200. In many cases, the last two activities 255-256 of the loan creation and sale sequence 250 may be performed by third-party servicers contracted by the purchaser and/or by the loan purchaser itself, such as a GSE.

As shown in the implementation of FIG. 2, the advisor suite 200, and thus all of its components 220-245, may include a web portal 215 (e.g., the web portal 122 of the server 120), which may be single sign-on portal and include integrated business intelligence. In some embodiments, a user, such as the lender 105 of FIG. 1, may register with the advisor suite through the single sign-on portal 215, such that the registration information provided by the lender 105 is available to the components 220-245 as needed. In some embodiments, the single sign-on portal 215 may be implemented as a dashboard that, among other things, aggregates overview information from multiple loans produced by a lender and gives the lender of view of how they are doing with the loans that they have produced using the advisor suite 200 and displays detailed information related to a notification 119 that caused a remote device 110, 140 to sign into the web portal 215.

Also as shown, the advisor suite 200, and thus all of its components 220-245, may employ a decision engine (not shown), which may be implemented as a rules engine that utilizes a rules repository that specifies the requirements for a loan's collateral and collateral appraisal to be acceptable to a potential purchaser and the requirements for a loan to be purchased by the purchaser, to be eligible for purchase by the purchaser, to qualify for a benefit from the purchaser (such as rep and warranty relief), or the like. In particular embodiments of the loan collateral advisor 225, the LCPE 125 may include a rules engine that applies collateral and appraisal rules from the collateral analysis rules and models repository 127, as shown in FIG. 1. In some implementations, the rules engine may also include various models (e.g., credit risk models, ranking models, Hedonic models, probability models, and the like) utilized by the purchaser, such that each advisor component 220-245 may use the same models.

Also as shown, the advisor suite 200, and thus all of its components 220-245, may employ an industry eVault-compatible data storage system or component, or the like for storing loan data, collateral data 132, etc.

In various implementations, the advisor suite 200 may analyze the loan data throughout the loan creation and sale sequence 250, acquiring more accurate loan data as time passes, providing real-time feedback and messaging to lender (e.g., the loan seller) that informs the lender what they need to fix or correct with respect to issues or problems that may prevent the loan from qualifying for a purchase or some other benefit offered by a secondary market purchaser. Among other advantages, the advice and guidance provided by the advisor suite 200 allows a lender to correct and create a salable or benefit-qualified loan more quickly, profitably, and efficiently than with conventional systems and techniques. And, the resulting high-quality loans produce rewards to borrowers and the industry, for example, in the form of improved loan performance and reduced foreclosures, among other things.

The example depicted in FIG. 2 is merely for the purpose of illustration and is not intended to be limiting. Further, the depicted system 200 is an example that has been simplified for clarity of explanation of certain novel and innovative features consistent with certain disclosed embodiments, but this example is not intended to be limiting and many variations are possible.

Figure 3:
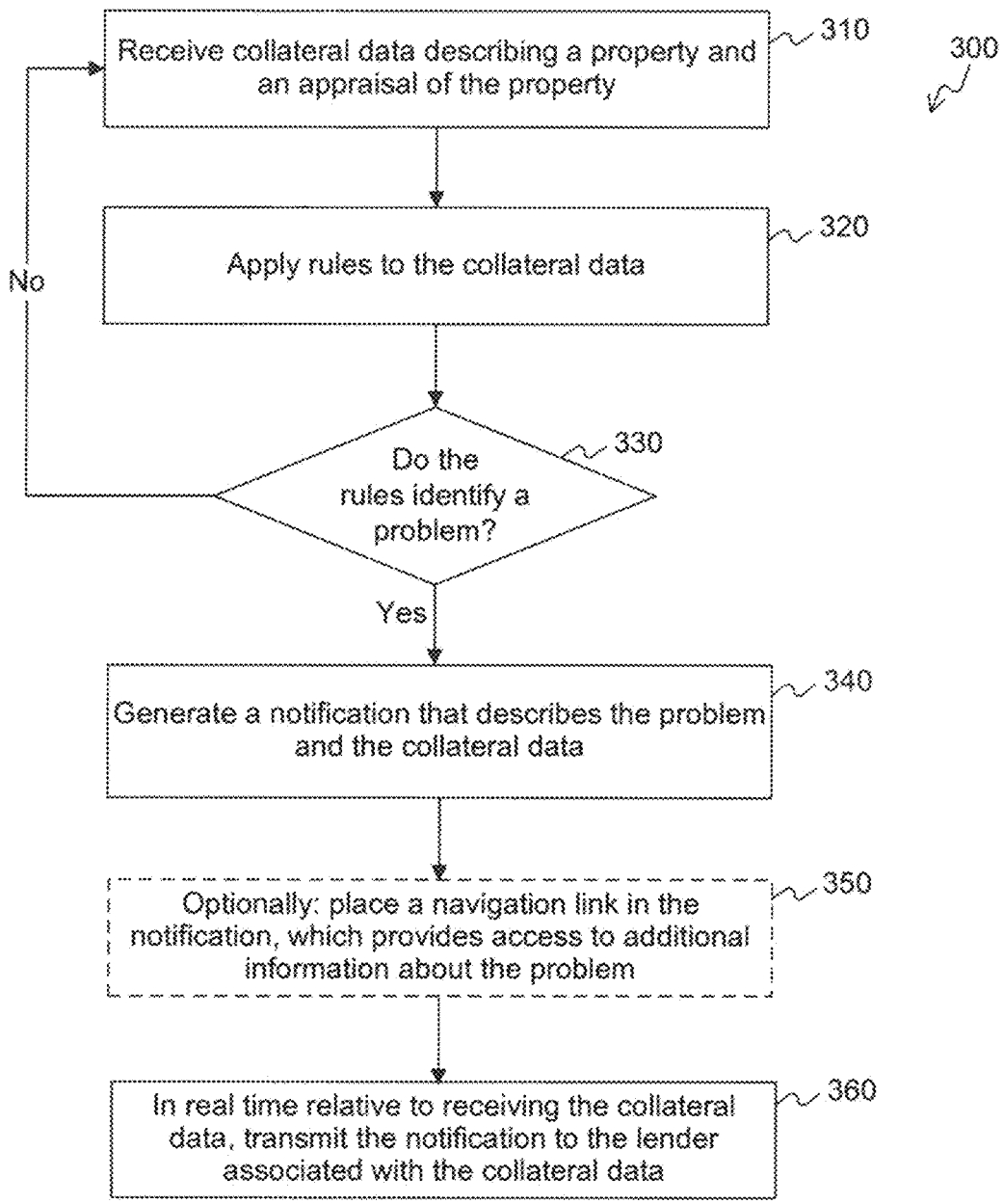
FIG. 3 is a flowchart showing an example of a process for identifying a problem with collateral and notifying a lender of the problem in real time, consistent with embodiments of the invention.

FIG. 3 is a flowchart showing an example of a process 300 for identifying a problem with collateral and notifying a lender of the problem in real time, consistent with embodiments of the invention. In various implementations, some or all of the process 300 may be performed by software executing on a general purpose computing system (which may include one or more processors or one or more computing subsystems), by a hardware-only system, or by a system that is a hybrid of the two. In one example, the process 300 may be implemented by a processor of the central server 120 of FIG. 1, and/or by the loan collateral processing engine 125.

In the embodiment shown in FIG. 3, the process 300 begins by receiving collateral data that describes a property and describes an appraisal of the property (310). In various embodiments, the collateral data may be a computer file or other digital data. In some embodiments, the collateral data may be in UAD format. In some embodiments, the collateral data may be the collateral data 132 received by the central server 120 from the database server 135, as described with respect to FIG. 1.

At 320, the process 300 applies one or more rules and/or models to the collateral data that was received in 310. In various embodiments, applying the rules may include evaluating the accuracy, completeness, and acceptability of the collateral data and validating the appraisal value for the property described by the collateral data against a value derived from comparable properties. To introduce an example of a rule, consider that for appraisals to comply with the UAD, the appraiser must assign one of six standardized quality ratings when indicating the quality of construction for the subject property (i.e., the collateral), where Q6 is defined as being a poor quality dwelling. A rule that checks for poor construction quality may check the appropriate field or information of the collateral data (e.g., a specific data field of the UAD) to determine whether or not the subject property was assigned a poor (Q6) rating. For instance, a "poor quality check" rule may state "IF construction quality rating=Q6 THEN signal a problem." The collateral evaluation rules and their application are described in further detail below with respect to FIG. 4. In various embodiments, the rule(s) applied to the collateral data 132 may be stored as the collateral analysis rules and models 127 and applied by the LCPE 125 as described with respect to FIG. 1.

In 330, the process 300 identifies or otherwise determines whether the rules (and/or models) detected a problem(s) in the collateral data. If no problems were identified with the collateral data (330, No), then the process 300 loops back to 310.

If, on the other hand, one or more problems were identified with the collateral data (330, Yes), then the process 300 proceeds to 340. At 340, the process 300 generates a notification that describes the problem and the collateral data that activated or triggered the rule. Continuing the previous example, if the "poor quality check" rule was triggered, the process 300 may generate a notification that includes a text description stating "A problem has been identified with the subject property because the quality rating of the subject property is reported to be Q6," and that includes information identifying the collateral that triggered the rule (e.g., a loan number, an appraisal number, an address of the property, or some other collateral-identification data). In some embodiments, the rule may specify the notification that is to be sent if the rule is triggered, such as "IF construction quality rating=Q6 THEN transmit a notification stating 'A problem has been identified with the subject property because the quality rating of the subject property is reported to be Q6.'" In various embodiments, the generated notification may be a notification 119 as described with respect to FIG. 1.

In some embodiments, the process 300 may optionally perform 350; while in other embodiments, 350 is not performed. In 350, the process 300 places a navigation link in the notification, where the navigation link provides access to additional information about the problem. In various embodiments, the navigation link may be URL or the like that points to a source of additional details and information about the problem, such as, for example, the web portal 122 or a web page that contains further information or details about the relevant collateral data and the problem, as described with respect to FIG. 1.

In some embodiments, the process 300 may further include providing a collateral viewer application to the lender that is associated with the collateral data that is being processed by the process 300 (not shown in FIG. 3), where the collateral viewer application is installed on a computing device of the lender and reacts to information in the notification and/or to the navigation link if it is present in the notification and automatically accesses additional details and information about the collateral problem. For example, as described with respect to FIG. 1, the lender 105 may download the collateral viewer application to a computing device 110, 140 when the lender 105 first registers for the collateral analysis and communication services provided by the process 300.

At 360, the process 300 transmits, in real time relative to receiving the collateral data in 310, the notification to the lender who is associated with the collateral data. In particular implementations, the process 300 may transmit the notification to a remote computing device that the lender has previously registered such that the process 300 can communicate with the device. In various embodiments as described with respect to FIG. 1, the transmitter 123 of the central server 120 under control of the LCPE 125 may transmit a real-time notification 119 to a remote computing device 110, 140 of the lender 105. As noted previously, the notification 119 may activate a collateral viewer application 115 or another application (e.g. an email or text messaging application) that is executing on the remote computing device 110, 140, and cause the notification 119 to display on the remote computing device. The notification 119 may also enable the remote computing device 110, 140 of the lender 105 to connect to a source of additional problem information (e.g., 120, 122). In some embodiments, the navigation link, if present, may enable or at least speed this connection.

After 360, the process 300 may repeat, return to a prior processing point, jump to a further or other processing point (not shown), or end.

In various embodiments, the real-time feedback from the process 300 (e.g., the notifications 119 activated by the collateral analysis rules and models 127) enables a lender 105 to quickly correct any collateral or appraisal problems before the loan is closed, (or to learn that there are no problems), thus reducing or eliminating the lender's risk of closing and creating a loan that the secondary market purchaser will refuse to buy. In addition, the real-time notifications 119 to the lender identify insoluble collateral problems in time to avoid or prevent a loss of money or other setback. For example, a real-time notification 119 may indicate that the collateral property is worth less than the loan amount, contrary to the faulty appraised value contained in the collateral data 132, and this timely information allows the lender to terminate the loan origination process before the loan closes and the loan monies are disbursed.

The process 300 depicted in FIG. 3 is an example for the purpose of illustration and is not intended to be limiting. Further, the depicted process 300 is an example that has been simplified for clarity of explanation of certain novel and innovative features consistent with certain disclosed embodiments, but many variations are possible. For example, while the functions and operations are shown as being performed in a particular order, the order described is merely an example, and various different sequences of operations can be performed, consistent with certain disclosed embodiments. Moreover, the operations are described as discrete steps merely for the purpose of explanation, and, in some embodiments, multiple operations may be performed simultaneously and/or as part of a single computation or larger operation. The operations described are not intended to be exhaustive, limiting, or absolute, and various operations can be modified, inserted, or removed. For example, in some variations, 330-360 may be modified such that the rules identify things in the collateral data that are not problems per se, but which should be brought to the lenders attention and perhaps acted upon. In such variations, the process 300 transmits a notification to the lender for triggering data items from the collateral data that are not impactful enough to be categorized as a problem.

Figure 4A:
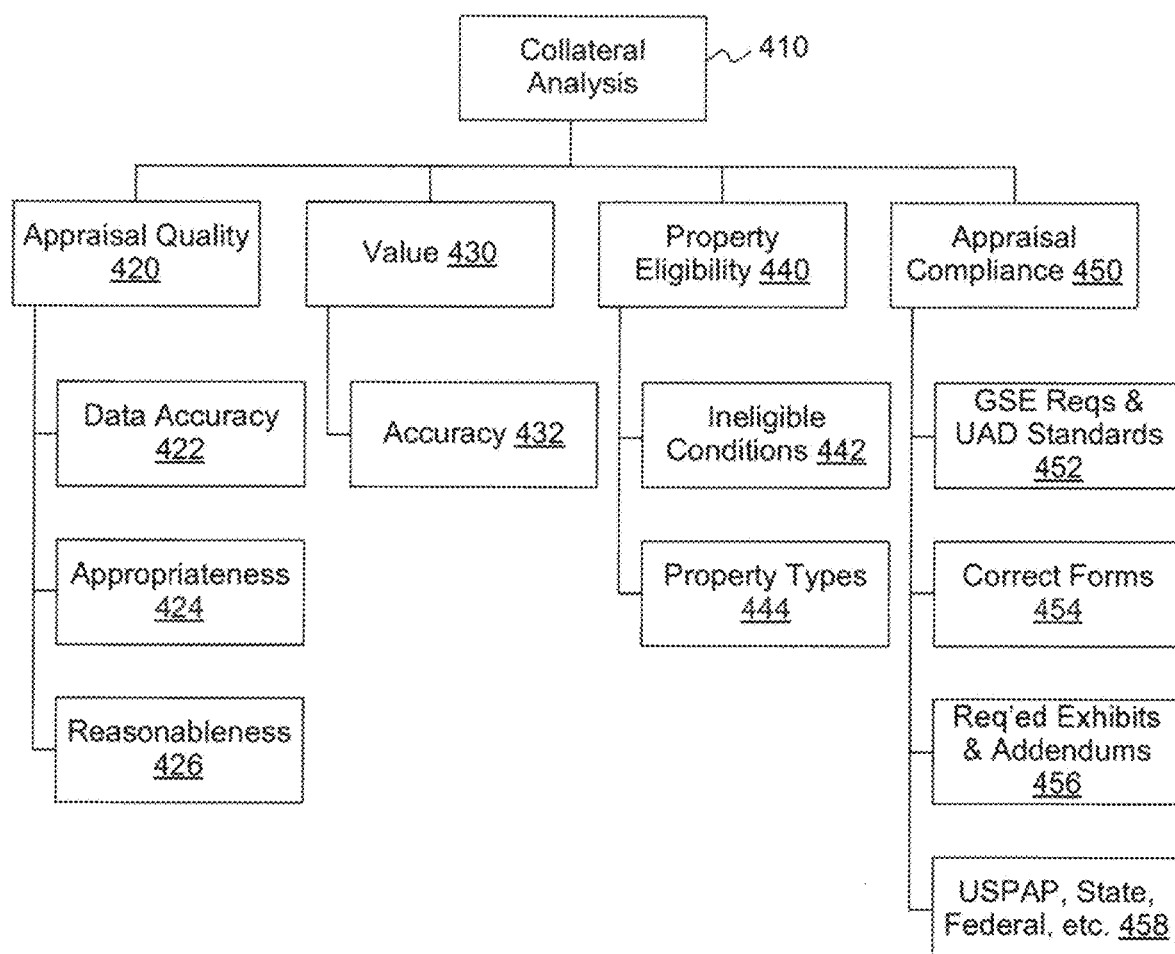
FIG. 4A is a block diagram showing an example of the types of collateral analysis that may be done by systems and methods consistent with embodiments of the invention.

FIG. 4A is a block diagram showing an example of the types of collateral analysis 410 that may be done by systems and methods consistent with embodiments of the invention. In various embodiments, the collateral analysis rules and models 127 that are applied by the LCPE 125 to the collateral data 132 (as shown in FIG. 1) may include rules from at least one and preferably all of the analysis types, areas, or categories depicted in FIG. 4A.

As shown, the collateral analysis 410 may be divided into four general categories: appraisal quality analysis 420, property value analysis 430, property eligibility analysis 440, and appraisal compliance analysis 450. Each of these general categories may be further divided into subcategories as shown.

The appraisal quality analysis 420-426 identifies current or potential problems with the appraisal information contained in the collateral data 132. More particularly, the data accuracy analysis 422 verifies that the appraisal data is complete and accurate. In various implementations of this analysis, the applied rules verify the presence of data in required fields and compare the data received to findings from various data sources (e.g., historical appraisals and $3^{rd}$ party data 150). Rules are also run to calculate values and compare them to entered values such as in the example of "Calculated Age" vs "Actual Age" of a property. Other examples include a verification of the reported living area, sale date, listing prices, and sale prices of the subject and comparable sales.

The appropriateness analysis 424 analyzes appraisals for the appropriateness of the comparable sale(s) provided. Rules and models are employed to determine whether the sale(s) provided are locationally, physically, and functionally the most similar, and whether they are the most recent and relevant indicators of value, represent current market condition, and are adjusted appropriately The reasonableness analysis 426 invokes several rules and models to examine the reasonableness of the analysis and conclusions provided in the appraisal report. For example, the overall value conclusion may be plotted and compared to the appraiser's adjusted sale range with a percentile and range limit producing a failure point (e.g., problem for notification). For another example, adjustment amounts, percentages, and rates may be compared to data from the appraisal report, as well as other market findings (archived appraisals, reports, etc.). In another example, condition, effective age, actual age, and reported kitchen and bathroom updates may be reconciled and compared with the individual results to produce a failure when discrepancy tolerances are exceeded.

The property (collateral) value analysis 430-432 identifies current or potential problems with the appraisal value information contained in the collateral data 132. More particularly, the accuracy analysis 432 tests the accuracy of the appraisal value opinion utilizing Automated Valuation Models, rule-based inspection comparing the final opinion to the sales provided, and/or models specialized to assess comparable selection, overall quality, and other factors.

The property eligibility analysis 440-444 identifies current or potential problems with the property information contained in the collateral data 132 with respect to eligibility for purchase of the property-backed loan by a secondary market loan buyer, such as a GSE, e.g., Freddie Mac. More particularly, the ineligible conditions analysis 442 tests eligibility against the potential loan buyer's requirements (e.g., a GSE's requirements) for sale and for program eligibility. In various implementations, the delivered data points are subjected to a rule-based analysis and properties or appraisal that do not meet any single requirement receive a failure. Some examples include properties not meeting a buyer's minimal condition requirements (e.g., a C rating lower than C5), and appraisals that do not have a borrower identified.

The property types analysis 444 assesses property types by form type and selections made within the form. In various implementations, separate rules and models may be applied for different form and property types. Additionally, rules may have conditions that produce failures dependent on form type or multiple field values. Text mining and "fuzzy logic" may also be employed to discover ineligible property types such as 'Condotel" "Motel" etc. for a buyer that requires residential properties And, the appraisal compliance analysis 450-458 identifies current or potential problems with the appraisal information contained in the collateral data 132. More particularly, the GSE requirements and UAD standards analysis 452 may occur in implementations that employ the UCDP® as the collateral data source 130. In various such implementations, the UAD rule set is run at the UCDP® and the findings are considered within the collateral analysis rules and models 127 used by the LCPE 125 to analyze and decision the appraisal. The UAD rule set is composed primarily of completeness and conformity-to-UAD-standards checks, and a few accuracy rules, such as appraiser license number, and address, may also be run.

The correct forms analysis 454 determines, based on rules, whether an incorrect form has been utilized in the appraisal. The rules may rely on historical findings, archived property data and databases, third party data, or reported findings within the report to determine whether the form utilized is incorrect.

The required exhibits and addendums analysis 456 parses data from selected addendums to the appraisal report and runs rules to verify that expected data is present and meets a minimum level of completeness. Some implementations may include analysis of XML embedded files and metadata.

The Uniform Standards of Professional Appraisal Practice (USPAP), state, and federal analysis 458 employs several targeted rules identify specific USPAP, State, and Federal compliance areas and to detect compliance failures. Rules such as an appraisal license number check, and an appraiser/borrower name check are run to identify potential and specific problems.

Figure 4B:
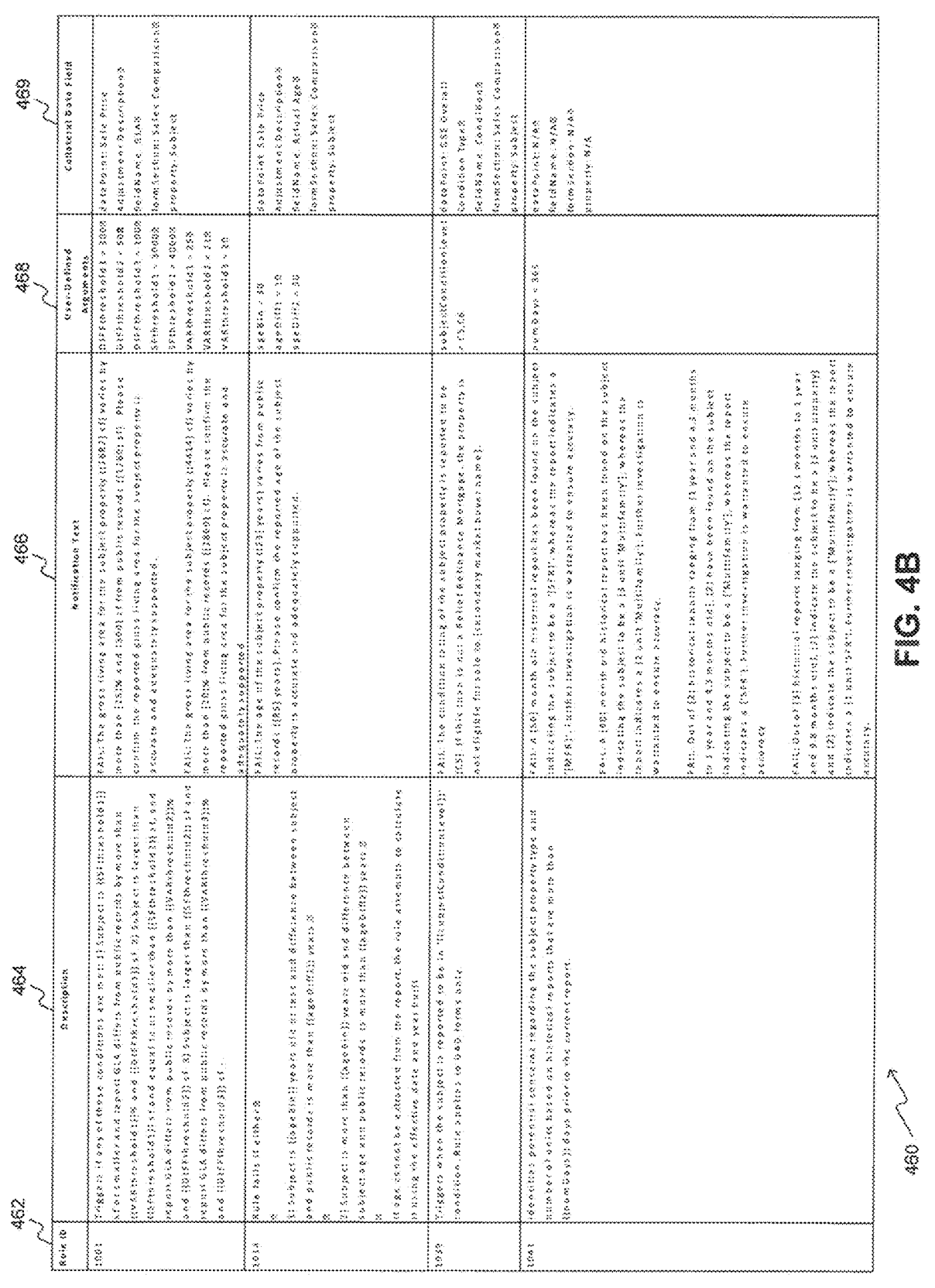

FIGS. 4B and 4C depict a table 460 showing examples of collateral analysis rules that are implemented by systems and methods consistent with embodiments of the invention. In various embodiments, the collateral analysis rules and models 127 that are applied by the LCPE 125 to the collateral data 132 (as shown in FIG. 1) may include rules as depicted in FIGS. 4B and 4C, and the like. Moreover, when a rule is triggered or activated (e.g., when its conditions are met by the collateral data 132, the supplemental data 152, and the like), the LCPE 125 may perform the action(s) specified by the rule, including transmitting a notification(s) 119 that includes the text shown in FIGS. 4B and 4C and/or similar information.

In various embodiments, the collateral analysis rules and models 127 represent, express, or implement at least a portion of the guidelines, requirements, criteria, etc. established by a secondary market purchaser for buying a loan that is backed by collateral, such as a mortgage loan this backed by a real-estate property as collateral.

For example, in the case where the loan is a mortgage loan for a single-family residence and the secondary market purchaser is the GSE Freddie Mac, the collateral analysis rules and models 127 may express or implement at least a portion the loan buying requirements set forth in Freddie Mac's Single-Family Seller/Servicer Guide. Thus, a system 100 that employs collateral analysis rules and models 127 that are designed or specified by Freddie Mac, provides lenders with pre-closing insight and information about Freddie Mac's requirements for appraisal quality and Freddie Mac's view of collateral risk, and also assists a lender in validating, managing and remediating appraisal quality issues and problems in time to gain purchase certainty for the mortgage loan that the lender is creating. And compared to current conventional systems, a system 100 that employs collateral analysis rules and models 127 that are designed or specified by a loan purchaser reduces or eliminates the risk that a lender will have to repurchase a loan after it sold because of faulty appraisals or other problems with the loan's collateral.

In the exemplary table of rules shown in FIG. 4A, the table 460 is organized into five columns, and each row of the table 460 defines or specifies the features of a different rule. The rule ID column 462 contains an identifier, such as a unique ID number, for each different rule.

The description column 464 contains a description of each rule, which includes the specific conditions or criteria with which the loan collateral must comply in order not to "fail" the rule or be identified as a problem, as described herein. In the examples of rule descriptions shown in the description column 464, "triggers" and "fails" means that the rule's one or more conditions or criteria have been met by the collateral data 132. In general, the rule descriptions shown in the description column 464 are specified in terms of conditions or criteria that indicate an incorrect, unexpected, in-error, abnormal, outside-of-requirements, nonstandard, anomalous, or otherwise undesirable state or value for a data item or data field, which may be generally called or described herein as problems.

The notification text column 466 contains a description or quotation of the text that the system 100 may send to the appropriate lender 105 when a rule is triggered—i.e., when a rule's conditions are met, indicating a failure (e.g. a problem with the collateral data 132). As noted above, the text shown in the notification text column 466 may be included in a notification 119 that is sent to a remote computing device 110, 140.

The examples shown in the notification text column 466 include a description of the problem that triggered or activated the rule, and variables that describe the collateral (e.g., values that are copied from the collateral data 132 that triggered the rule). For example, consider the first example of notification text 466 for the rule having ID number 1001 (i.e., the first row of the table in FIG. 4B), which states "FAIL: The gross living area for the subject property ([1682] sf) varies by more than [25]% and [300] sf from public records ([1260] sf). Please confirm the reported gross living area for the subject property is accurate and adequately supported." In this message, the values enclosed by parenthesis and brackets are variables that describe the collateral property because they come from the specific collateral data 132 and/or the supplemental data 152 that triggered this rule. For instance "([1682] sf)" describes the square footage of the collateral subject property as recorded in the collateral data 132, and "([1260] sf)" describes the square footage of the collateral subject property as recorded in the public records, which may be obtained, for example, as supplemental data 152 from the third party and archived data source 150.

In the embodiment shown, the user defined arguments column 468 contains the names and values of arguments or variables that define one or more conditions or criteria used by a rule. The values of the user defined arguments may be set and revised by an operator of the system 100, and in various embodiments, may be controlled and defined by a potential purchaser of the collateralized loan, (such as a GSE that is a secondary market purchaser of home mortgage loans). In addition, the potential purchaser of the collateralized loan may specify or create the collateral analysis rules in their entirety, as the rules define the purchaser's requirements for purchase of the loan and/or for other benefits, such as rep and warranty relief.

The collateral data field column 469 contains the name or identifier of the data field, data point, or other specific item of data from the collateral data 132 that the system 100 accesses and analyzes to apply (e.g., interpret or execute) the rule.

The examples depicted in FIGS. 4A-C are merely for the purpose of illustration and are not intended to be limiting. Further, the depicted examples have been simplified for clarity of explanation of certain novel and innovative features consistent with certain disclosed embodiments, but these examples are not intended to be limiting and many variations are possible.

Figure 5:
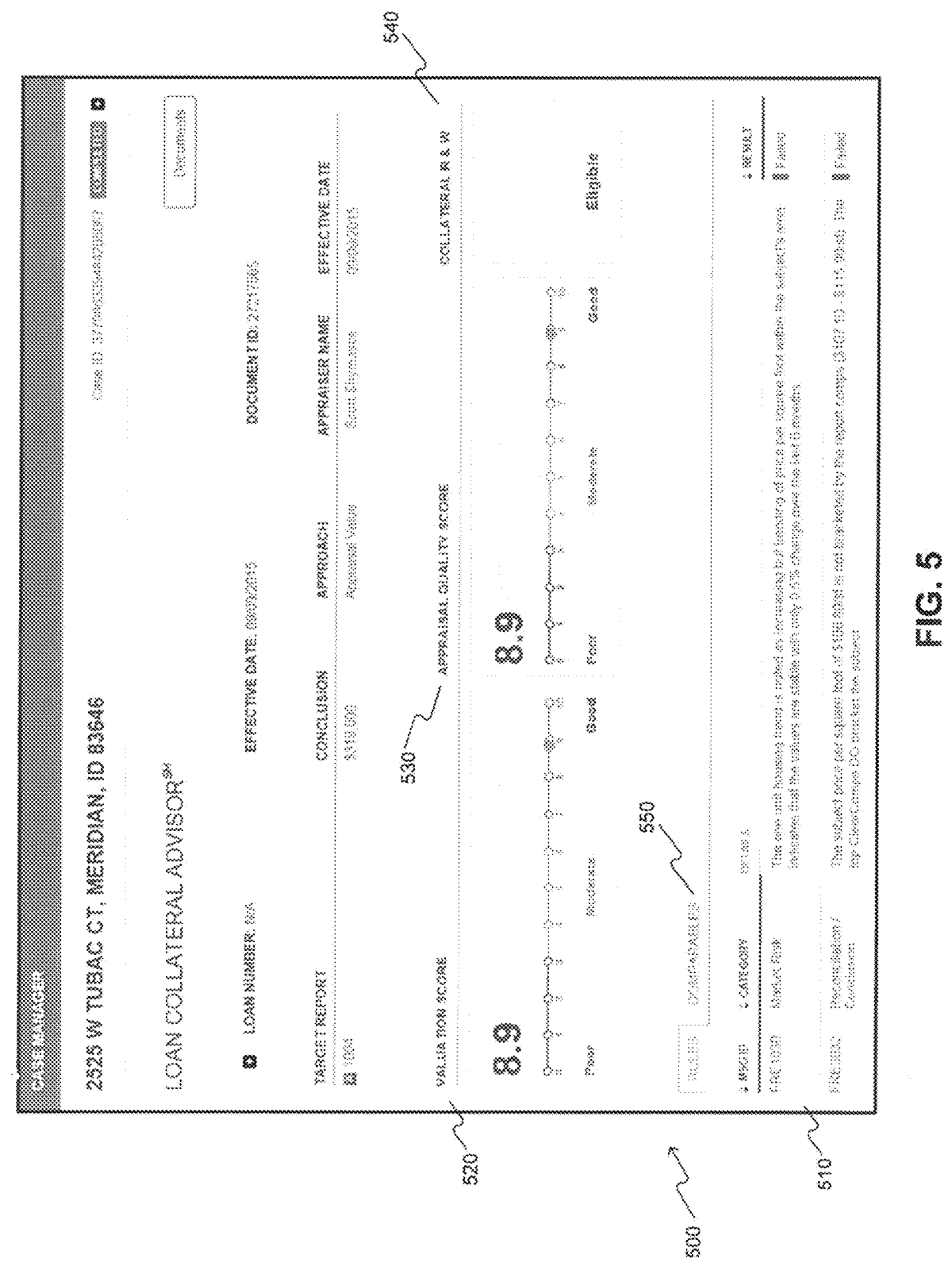

FIG. 5 is an example of a graphical user interface (GUI) 500 for displaying detailed information about collateral problems, data, and rules, consistent with embodiments of the invention. In various embodiments, the lender computing device 110 or the mobile computing device 140 may display the GUI 500, and the lender 105 may interact with the GUI 500. In various embodiments, the lender computing device 110 or the mobile computing device 140 may automatically present the GUI 500 to the lender 105 in response to receiving a real time notification 119 from the central server 120, where the GUI 500 displays detailed problem information about the collateral that is the subject of (e.g., that triggered) the real time notification 119. In such embodiments, the text of the real time notification 119 may contain information that identifies the subject collateral (i.e., the triggering collateral), and the computing device 110, 140 may connect to the central server 120 based only on the information from the text of the notification 119. In such embodiments, the computing device 110, 140 may employ a browser application or the collateral viewer application 115 to access and display the problem information related to the collateral on the GUI 500.

In some embodiments, the real time notification 119 may contain a navigation link that points to a data source that supplies the detailed problem information (e.g., the central server 120, its web portal 122, or a separate web site or web page). In some such embodiments, the computing device 110, 140 may connect to the data source using the navigation link when the lender 105 activates the navigation link. In another such embodiment, the computing device 110, 140 may automatically connect to the data source using the navigation link without any action by the lender 105. In either case, the GUI 500 presents, to the lender 105, detailed problem information about the collateral that is the subject of the real time notification 119 as the navigation link points directly to the relevant problem information.

In the embodiment of FIG. 5, the GUI 500 may display various types of information 510-550 related to the problem and the collateral. In the example shown, the GUI 500 may display information about the rules 510 that failed or identified a problem in the collateral data 132. The GUI 500 may also display a calculated valuation score 520 that rates the accuracy and exactness of the appraisal value for the collateral property, where the valuation score 520 may indicate a problem if it is below a certain threshold (e.g. below 3 on a 0 to 10 scale). The GUI 500 may also display a calculated appraisal quality score 530 that rates the quality of the appraisal performed on the collateral property, where the appraisal quality score 530 may indicate a problem if it is below a certain threshold (e.g. below 3 on a 0 to 10 scale). The GUI 500 may also display a collateral rep and warranty relief indicator 540 that indicates whether the collateral property met a loan buyer's requirements for rep and warranty relief on a loan backed by the collateral (e.g., as specified in the collateral analysis rules and models 127), where the collateral rep and warranty relief indicator 540 may indicate a problem if the collateral is determined to be ineligible for rep and warranty relief.

In addition to the detailed collateral and problem information shown directly on the GUI 500, the GUI 500 may also include controls and the like that allow the lender 105 to access and display additional information. For example, the word headings for the valuation score 520, for the appraisal quality score 530, and for the collateral rep and warranty indicator 540 may be hyperlinks that access and display additional information about each, including information about any problems (e.g. rule failures) that caused a low score or the like. For another example, the comparables tab 550 may be a control that displays information about the comparable properties used to generate the valuation score 520 or that are referenced in a failed rule message 510, including comparable sales data for better suggested comparables than were used in the appraisal of the collateral data 132, based on time, distance and physical similarity.

In other embodiments (not shown) the GUI 500 may display collateral information such as images of physical appraisal documents, the collateral analysis rules and models 127 that were applied, sales and listings information for comparables, maps showing the subject property and the comparables, charts and graphs comparing various aspects of the subject property with the same aspects of the comparables, etc.

The example of a GUI 500 shown in FIG. 5 is merely for the purpose of illustration and is not intended to be limiting. Further, the depicted example has been simplified for clarity of explanation of certain novel and innovative features consistent with certain disclosed embodiments, but this example is not intended to be limiting and many variations are possible.

Figure 6:
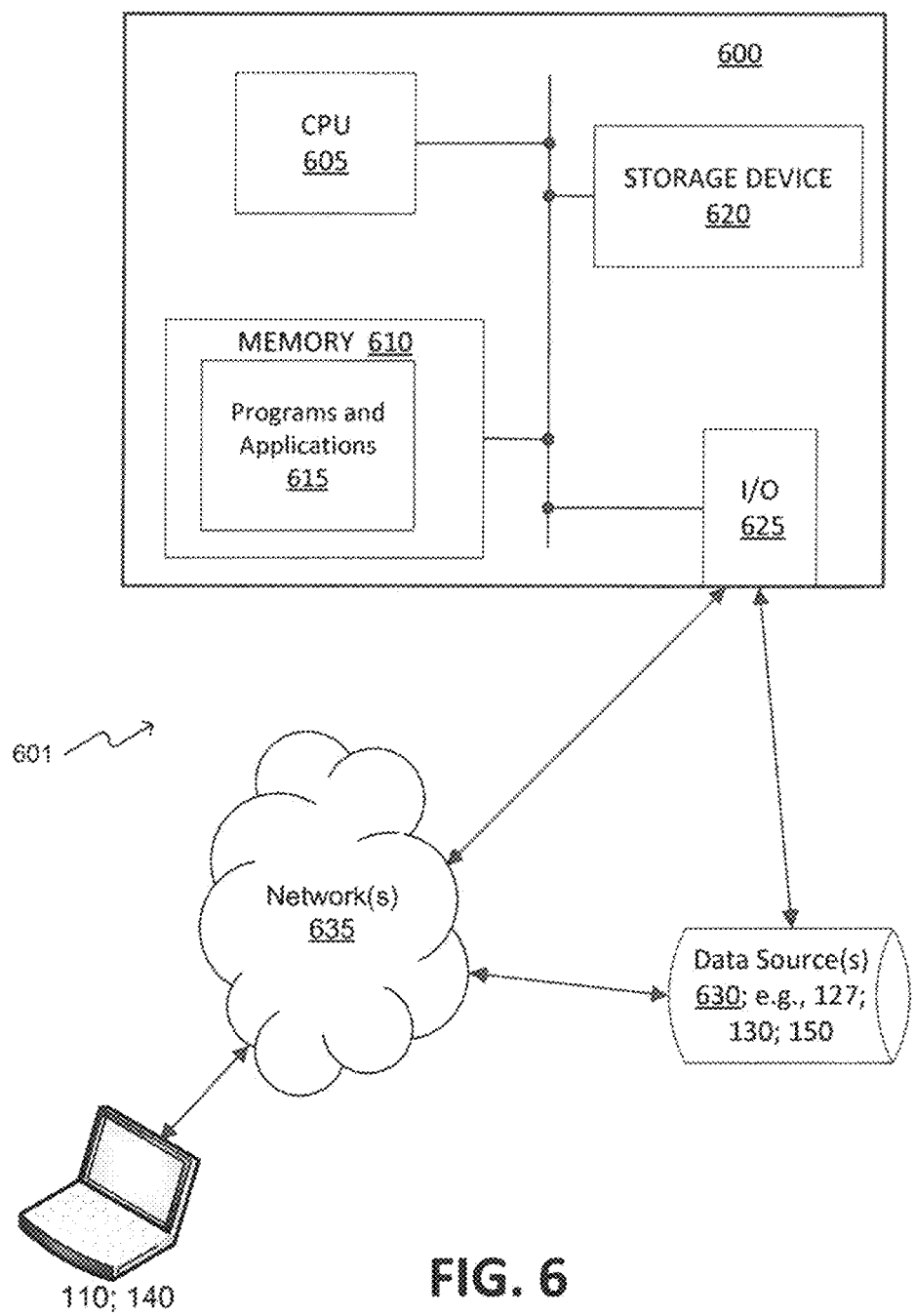
FIG. 6 is a block diagram of an example of a computing system that may be used for implementing systems and methods consistent with embodiments of the invention.

FIG. 6 is a block diagram of an example of a computing environment 601, which includes a computing system 600 that may be used for implementing systems and methods consistent with embodiments of the invention. Other components and/or arrangements may also be used. In some embodiments, computing system 600 may be used to implement, at least partially, various components of FIGS. 1-2, such as the central server 120, the lending computing device 110, the mobile computing device 140, the database server 135, and the loan collateral advisor 225, among other things. In some embodiments, a series of computing systems similar to computing system 600 may be each customized with specialized hardware and/or programmed as a specialized server to implement one of the components of FIGS. 1-2, which may communicate with each other via a network 635.

In the example shown in FIG. 6, the computing system 600 includes a number of components, such as a central processing unit (CPU) 605, a memory 610, an input/output (I/O) device(s) 625, and a nonvolatile storage device 620. System 600 can be implemented in various ways. For example, an implementation as an integrated platform (such as a server, workstation, personal computer, laptop, smart phone, etc.) may comprise CPU 605, memory 610, nonvolatile storage 620, and I/O devices 625. In such a configuration, components 605, 610, 620, and 625 may connect and communicate through a local data bus and may access a data source 630 (implemented, for example, as a separate database system) via an external I/O connection. I/O component(s) 625 may connect to external devices through a direct communication link (e.g., a hardwired or local wifi connection), through a network, such as a local area network (LAN) or a wide area network (WAN, such as a cellular telephone network), and/or through other suitable connections. System 600 may be standalone or it may be a subsystem of a larger system.

CPU 605 may be one or more known processor or processing devices, such as a microprocessor from the Core™ family manufactured by the Intel™ Corporation of Santa Clara, Calif. or a microprocessor from the Athlon™ family manufactured by the AMD™ Corporation of Sunnyvale, Calif. Memory 610 may be one or more fast storage devices configured to store instructions and information used by CPU 605 to perform certain functions, methods, and processes related to embodiments of the present invention. Storage 620 may be a volatile or non-volatile, magnetic, semiconductor, tape, optical, or other type of storage device or computer-readable medium, including devices such as CDs and DVDs and solid state devices, meant for long-term storage.

In the illustrated embodiment, memory 610 contains one or more programs or applications 615 loaded from storage 620 or from a remote system (not shown) that, when executed by CPU 605, perform various operations, procedures, processes, or methods consistent with the present invention. Alternatively, CPU 605 may execute one or more programs located remotely from system 600. For example, system 600 may access one or more remote programs via network 635 that, when executed, perform functions and processes related to embodiments of the present invention.

In one embodiment, memory 610 may include a program(s) 615 for performing the specialized functions and operations described herein for the LCPE 125, the web portal 122, the GUI 500, and/or the collateral viewer application 115. In some embodiments, memory 610 may also include other programs or applications that implement other methods and processes that provide ancillary functionality to the invention. For example, memory 610 may include programs that access, gather, organize, store, and/or generate invention-related data, such as the collateral analysis rules and models 127, the collateral data 132, the registration information 118, etc.

Memory 610 may be also be configured with other programs (not shown) unrelated to the invention and/or an operating system (not shown) that performs several functions well known in the art when executed by CPU 605. By way of example, the operating system may be Microsoft Windows™, Unix™, Linux™, an Apple Computers™ operating system, Personal Digital Assistant operating system such as Microsoft CE™, or other operating system. The choice of operating system, and even to the use of an operating system, is not critical to the invention.

I/O device(s) 625 may comprise one or more input/output devices that allow data to be received and/or transmitted by system 600. For example, I/O device 625 may include one or more input devices, such as a keyboard, touch screen, mouse, and the like, that enable data to be input from a user. Further, I/O device 625 may include one or more output devices, such as a display screen, CRT monitor, LCD monitor, plasma display, printer, speaker devices, and the like, that enable data to be output or presented to a user. I/O device 625 may also include one or more digital and/or analog communication input/output devices that allow computing system 600 to communicate, for example, digitally, with other machines and devices, such as the transmitter 123 and the receiver 124. Other configurations and/or numbers of input and/or output devices may be incorporated in I/O device 625.

In the embodiment shown, system 600 is connected to a network 635 (such as the Internet, a private network, a virtual private network, a cellular network or other network or combination of these), which may in turn be connected to various systems and computing machines, such as servers, personal computers, laptop computers, client devices, etc. and for example, the lending computing device 110 or the mobile device 140. In general, system 600 may input data from external machines and devices and output data to external machines and devices via network 635.

In the exemplary embodiment shown in FIG. 6, the data source 630 is a standalone database external to system 600. In other embodiments, data source 630 may be hosted by system 600. In various embodiments, data source 630 may manage and store data used to implement systems and methods consistent with the invention. For example, data source 630 may manage and store data structures that contain the collateral analysis rules and models 127, the collateral data 132, the registration information 118, and the like.

Data source 630 may comprise one or more databases that store information and are accessed and/or managed through system 600. By way of example, database 630 may be an Oracle™ database, a Sybase™ database, or other relational database. Systems and methods consistent with the invention, however, are not limited to separate data structures or databases, or even to the use of a database or data structure.

One of ordinary skill will recognize that the components and implementation details of the system in FIG. 6 are examples presented for conciseness and clarity of explanation. Other components and implementation details may be used.

Other embodiments of the invention will be apparent to those skilled in the art from consideration of the specification and practice of the invention disclosed herein. It is intended that the specification and examples be considered as exemplary only, with a true scope of the invention being indicated by the claims below.

What is claimed is:

1. A system for communicating loan collateral information to a remote computing device of a remote lender, the system comprising:

a central server comprising:
a memory that stores instructions, a destination address for the remote computing device, and collateral identification information that was provided by the remote lender;
a transmitter; and
a processor, operably connected to the memory and the transmitter, that executes the instructions to perform operations comprising:
receiving collateral data from a collateral data source, wherein the collateral data is filtered based on the collateral identification information;
identifying a problem in the filtered collateral data by applying a set of collateral analysis rules to the filtered collateral data, wherein applying the set of collateral analysis rules to the filtered collateral data comprises accessing supplemental data related to the filtered collateral data from a remote data source and identifying the problem by detecting one or more differences between the filtered collateral data and the supplemental data;
generating a notification that includes a description of the problem, a description of the filtered collateral data, and a navigation link to access more information from a source of problem information related to the filtered collateral data; and
transmitting, using the transmitter, the notification to the remote computing device based upon the destination address, the notification being in a format that is compatible with the remote computing device, the destination address comprising an internet protocol address of the remote computing device;
wherein the notification activates a collateral viewer application to cause the notification to display on the remote computing device and to enable a connection to the source of problem information via the navigation link to access more information.

2. The system of claim 1, wherein the description of the problem included within the notification is based on a particular collateral analysis rule that was triggered.

3. The system of claim 2, wherein the description of the problem included within the notification further includes a narrative associated with the particular collateral analysis rule that was triggered.

4. The system of claim 1, wherein the operations further comprise:
providing the collateral viewer application to the remote computing device.

5. The system of claim 1, wherein the notification causes the collateral viewer application to automatically connect to the source of problem information to access more information about the problem.

6. The system of claim 1, wherein the source of problem information is the central server.

7. The system of claim 1, wherein the set of collateral analysis rules represent collateral requirements for purchase of a loan associated with the filtered collateral data by a potential buyer of the loan.

8. The system of claim 1, wherein the central server includes a web portal through which registration information from the remote lender is provided, the registration information including the destination address of the remote computing device and the collateral identification information.

9. A method of communicating loan collateral information to a remote computing device of a remote lender, the method comprising:
receiving, at a central server, collateral data from a collateral data source;
identifying, by the central server, a problem in the received collateral data by applying a set of collateral analysis rules to the collateral data;
generating, by the central server, a notification that includes a description of the problem, a description of the collateral data, and a navigation link to access more information from a source of problem information related to the collateral data; and
transmitting, by the central server, the notification to the remote computing device based upon a destination address of the remote computing device, the notification being in a format that is compatible with the remote computing device, the destination address comprising an internet protocol address of the remote computing device;
wherein the notification activates a collateral viewer application to cause the notification to display on the remote computing device and to enable connection to the source of problem information via the navigation link to access more information.

10. The method of claim 9, further comprising:
filtering the collateral data that was received based on collateral identification information.

11. The method of claim 10, further comprising receiving registration information from the remote lender via a web portal of the central server, the registration information including the destination address of the remote computing device and the collateral identification information.

12. The method of claim 9, wherein the description of the problem included within the notification is based on a particular collateral analysis rule that was triggered and further includes a narrative associated with the particular collateral analysis rule that was triggered.

13. The method of claim 9, wherein the notification causes the collateral viewer application to automatically connect to the source of problem information to access more information about the problem.

14. The method of claim 9, wherein the source of problem information is the central server.

15. The method of claim 9, further comprising:
accessing, by the central server, supplemental data related to the collateral data from a remote data source; and
wherein the applying a set of collateral analysis rules to the collateral data comprises:
comparing information from the collateral data to information from the supplemental data to detect any differences related to the collateral data.

16. The method of claim 9, wherein the set of collateral analysis rules represent collateral requirements for purchase of a loan associated with the collateral data by a potential buyer of the loan.

17. At least one non-transitory computer-readable storage medium having instructions stored thereon for at least one processor of a computing device, wherein when the instructions are executed by the at least one processor, the computing device performs operations comprising:
receiving collateral data from a collateral data source;
identifying a problem in the received collateral data by applying a set of collateral analysis rules to the received collateral data;
generating a notification that includes a description of the problem and a description of the collateral data; and transmitting the notification to a remote computing device based on a destination address of a remote computing device, the notification being in a format that is compatible with the remote computing device;

wherein the transmitted notification activates the remote computing device to cause the notification to display on the remote computing device and to enable connection to a source of problem information related to the collateral data to access more information.

18. The at least one non-transitory computer-readable storage medium of claim, 17, wherein the operations further comprise providing a collateral viewer application to the remote computing device for installation, wherein the collateral viewer application displays the notification and enables the connection.

19. The at least one non-transitory computer-readable storage medium of claim 17, wherein:

the generating of the notification further comprises including a navigation link in the notification, and wherein the remote computing device enables the connection to the source of problem information related to the collateral data using the navigation link.

20. The at least one non-transitory computer readable storage medium of claim 17, wherein the operations further comprise:

filtering the received collateral data based on collateral identification information to identify the collateral data related to loans of a remote lender, wherein the remote lender provides the collateral identification information.

* * * * *